H. HESS.
BALL BEARING.
APPLICATION FILED APR. 27, 1906.

951,244.

Patented Mar. 8, 1910.

WITNESSES
Lilian Brock
Nancey E. Costello.

INVENTOR
Henry Hess,
by Brocksmith
Attys.

UNITED STATES PATENT OFFICE.

HENRY HESS, OF PHILADELPHIA, PENNSYLVANIA.

BALL-BEARING.

951,244.　　　Specification of Letters Patent.　　Patented Mar. 8, 1910.

Application filed April 27, 1906. Serial No. 313,975.

*To all whom it may concern:*

Be it known that I, HENRY HESS, a citizen of the United States, and a resident of Philadelphia, in the county of Philadelphia and State of Pennsylvania, have invented a new and useful Ball-Bearing, of which the following is a specification.

My invention relates to ball bearings, and especially to means for separating the adjacent balls. Its objects and advantages will be fully pointed out hereafter in connection with a detailed description, reference being had to the accompanying drawing which illustrates an exemplifying structure in which my invention is embodied, and in which—

Figure 1:
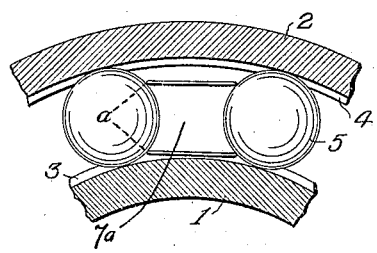
Figure 3:
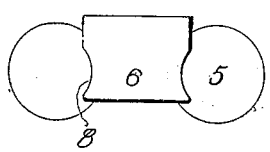
Figure 2:
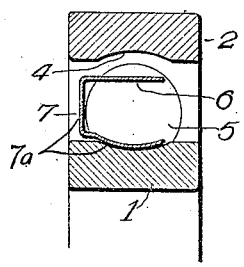
Figure 4:
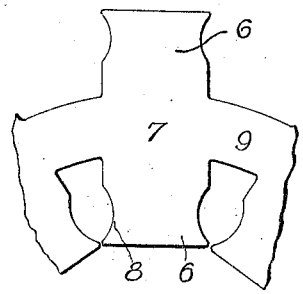
Figure 5:
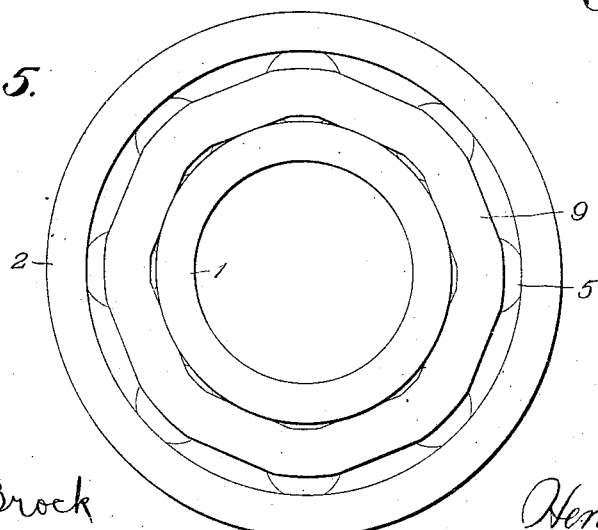

Figure 1 is a transverse sectional view of a segment of the bearing; Fig. 2, a section taken on a radial plane; Fig. 3, a plan view of the separator; Fig. 4, a fragmentary view of a blank from which the separator may be conveniently formed; and Fig. 5 is an end view of the complete bearing with the separators in place.

In the drawings, 1 is an inner bearing ring and 2 an outer bearing ring provided with ball races 3 and 4 respectively; 5, a suitable number of balls in the races; the foregoing constituting a typical ball bearing. In the present exemplification it is of the non-adjustable ring type; but my invention is applicable to a wide variety of bearings and the exact form of the same is therefore not essential. The invention may, for instance, be applied to adjustable bearings, in many cases.

7 is the general designation of a separator interposed between two adjacent balls 5. It consists generally of sheet spring metal and is conveniently formed from a flat blank such as shown in Fig. 4. In its completed form it comprises two wings 6 extending between the two adjacent balls in a direction generally parallel with the axis of the bearing, and each provided at each end with a notch 8, preferably of the shape of a segment of a circle. These notches engage the balls and prevent accidental displacement of the separator. The separator is so proportioned that the notches 8 contact with the balls with a slight pressure and tend to return the balls to their normal relative positions if displaced therefrom. Under certain conditions of operation in ball bearings, one ball tends at times to run at a speed different from that of its neighbor, and in such a case, supposing the balls in Fig. 1 to tend to approach each other, the surface of the ball contacting with the notches 8, acts as a wedge and forces the wings 6 slightly apart, permitting the necessary relative movement of the balls. The angle $a$ of the arc embraced by the wings 6 is such as to permit the balls to exercise this wedge action without too great pressure upon the separator members. Attention is called to the fact that each of these separators is conveniently and cheaply formed from a single piece of metal and is therefore of great simplicity. It is self-adjusting, and should there be any wear, will automatically compensate therefor. In addition to performing the function of permitting relative movement of the balls as described, the separator also renders the bearing noiseless by preventing clicking of the balls together.

In many cases it is desired to have the separators each entirely independent of the other. Such independent separators are designated in Figs. 1 and 2 by the character 7ª. It will be readily understood by comparison with Fig. 4 how these independent separators may be formed out of suitable blanks. In other cases, however, it is desirable to interconnect the separators. This may be done by attaching them individually to a suitable ring, or they may all be made integrally from a single piece of sheet metal, such as is shown in Fig. 4. In this construction the individual separators are joined by parts 9 of the blank, and when the separator is completed it has the general shape of a ring as shown in Fig. 5.

Many variations from the structures described will occur to those versed in the art, and I contemplate any possible variations within the spirit of my invention as well as the structures herein shown.

What I claim is:

A separator adapted to be inserted between two adjacent balls in an annular ball bearing having bearing rings provided with races of curved cross section, consisting of a piece of sheet metal having a web and two flanges, the flanges being notched to engage segments of the balls, and one of the flanges being curved to approximately conform to one of the races.

In testimony whereof I have affixed my signature in the presence of two witnesses.

HENRY HESS.

Witnesses:
　Theo. H. M'Calla,
　C. L. M'Calla.